US009176610B1

(12) United States Patent
Kruge et al.

(10) Patent No.: US 9,176,610 B1
(45) Date of Patent: Nov. 3, 2015

(54) AUDIOVISUAL SAMPLING FOR PERCUSSION-TYPE INSTRUMENT WITH CROWD-SOURCED CONTENT SOURCING AND DISTRIBUTION

(75) Inventors: Nick Kruge, San Francisco, CA (US); Ge Wang, Palo Alto, CA (US); Perry R. Cook, Applegate, OR (US)

(73) Assignee: Smule, Inc., San Francisco, CA (US)

( * ) Notice: Subject to any disclaimer, the term of this patent is extended or adjusted under 35 U.S.C. 154(b) by 560 days.

(21) Appl. No.: 13/607,153

(22) Filed: Sep. 7, 2012

Related U.S. Application Data

(60) Provisional application No. 61/532,088, filed on Sep. 7, 2011.

(51) Int. Cl.
| | |
|---|---|
| *H04N 5/92* | (2006.01) |
| *G06F 3/041* | (2006.01) |
| *G06F 3/01* | (2006.01) |
| *G06F 3/0484* | (2013.01) |
| *G06F 3/0481* | (2013.01) |
| *G06F 3/14* | (2006.01) |
| *G06F 3/023* | (2006.01) |

(52) U.S. Cl.
CPC ............... *G06F 3/041* (2013.01); *G06F 3/017* (2013.01); *G06F 3/0236* (2013.01); *G06F 3/04817* (2013.01); *G06F 3/04842* (2013.01); *G06F 3/1446* (2013.01)

(58) Field of Classification Search
CPC .......... G06F 3/041; G06F 2203/04106; G06F 3/017; G06F 2203/04808; G06F 3/04817; G06F 3/04842; G06F 3/0236; G06F 3/1446

USPC .......... 386/337, 339, 340, 341; 715/835, 783, 715/723
See application file for complete search history.

(56) References Cited

U.S. PATENT DOCUMENTS

| | | | | |
|---|---|---|---|---|
| 2008/0155459 | A1* | 6/2008 | Ubillos .......................... | 715/783 |
| 2008/0165141 | A1* | 7/2008 | Christie ......................... | 345/173 |
| 2010/0258360 | A1* | 10/2010 | Yilmaz ....................... | 178/18.06 |
| 2011/0181521 | A1* | 7/2011 | Reid et al. .................... | 345/173 |
| 2012/0311499 | A1* | 12/2012 | Dellinger et al. .............. | 715/835 |
| 2015/0058733 | A1* | 2/2015 | Novikoff ....................... | 715/723 |

OTHER PUBLICATIONS

Akai Pro. <http://www.akaipro.com/mpc>. Retrieved Jan. 2011. Last accessed Sep. 7, 2012.
M. Chion. "Audio-Vision Sound on Screen." Columbia University Press, Jul. 1994. <http://soundenvironments.files.wordpress.com/2011/11/michelchion_audio-vision.pdf>. Last accessed Sep. 7, 2012.

(Continued)

*Primary Examiner* — Helen Shibru
(74) *Attorney, Agent, or Firm* — Haynes and Boone, LLP

(57) ABSTRACT

Building on a set of captured audiovisual segments clipped to provide a palette of audio and synched video, techniques and implementations described herein facilitate a new and highly-personalized (and in some cases crowd-sourced or sourcable) genre of audiovisual sampling and musical performance. Using a palette of captured and/or imported audio and associated video, users can remix to create a coordinated audio-visual performance. Because the audiovisual sampling and musical performance capabilities can be hosted on ubiquitous handheld or other portable computing devices such as smartphones and/or pad-type computers, user/musicians can, in essence, creatively remix their life.

24 Claims, 11 Drawing Sheets

(56) References Cited

OTHER PUBLICATIONS

J. Colegrove. "The state of the touch screen market in 2010." Display Search Touch Panel Market Analysis. Retrieved Jan. 25, 2011 from <http://large.stanford.edu/courses/2012/ph250/Iee2/docs/March_2010_ID_State_of_the_Touch_Screen_Market.pdf> Last accessed Sep. 7, 2012.

J. Conte. "VideoSong 1—Push—Jack Conte." Online video clip. YouTube, Mar. 2008. Retrieved Jan. 25, 2011 from <http://www.youtube.com/watch?v=FUVgPjnEMzw>. Last accessed Sep. 7, 2012.

J. Dack. "Technology and the instrument." musik netz werke—Konturen der neuen Musikkultu, 2002. <http://eprints.mdx.ac.uk/463/>. Last accessed Sep. 7, 2012.

G. Essl et al. "Developments and Challenges turning Mobile Phones into Generic Music Performance Platforms." In Proceedings of the Mobile Music Workshop, Vienna, Austria, 2008. <http://web.eecs.umich.edu/~gessl/georg_papers/MMW08-generic.pdf>. Last accessed Sep. 7, 2012.

L. Gaye et al. "Mobile music technology: Report on an emerging community." In Proceedings of the International Conference on New Interfaces for Musical Expression, pp. 22-25, Paris, France. <http://www.sics.se/fal/events/mobilemusic/mmw_NIME06.pdf>. Last accessed Sep. 7, 2012.

G. Geiger. "Using the Touch Screen as a Controller for Portable Computer Music Instruments." In Proceedings of the International Conference on New Interfaces for Musical Expression, Paris, France, 2006. <http://www.nime.org/proceedings/2006/nime2006_061.pdf>. Last accessed Sep. 7, 2012.

L. Gjertsen. "Amateur." Online video clip. YouTube, Nov. 2006. Retrieved Apr. 25, 2011 from <http://www.youtube.com/watch?v=JzqumbhfxRo>. Last accessed Sep. 7, 2012.

G. Levin. "Dialtones—a telesymphony." Sep. 2001. Retrieved Apr. 25, 2011 from <http://www.flong.com/projects/telesymphony/>. Last accessed Sep. 7, 2012.

Penguin Group USA. "Mad libs." Retrieved Jan. 25, 2011from <http://www.madlibs.com>. Last accessed Sep. 7, 2012.

Two Hand Band. "History and Significance of the MPC." Documentary Film, Aug. 2008. <http://www.cratekings.com/two-hand-band-history-and-significance-of-the-akai-mpc/>. Last accessed Sep. 7, 2012.

G. Wang. "Designing Smule's iPhone Ocarina." In Proceedings of the International Conference on New Interfaces for Musical Expression, Pittsburgh, USA, 2009. <https://ccrma.stanford.edu/~ge/publish/ocarina-nime2009.pdf>. Last accessed Sep. 7, 2012.

G. Wang et al. "Do Mobile Phones Dream of Electric Orchestras?" In Proceedings of the International Computer Music Conference, Belfast, 2008. <https://ccrma.stanford.edu/groups/mopho/publish/mopho_icmc2008.pdf>. Last accessed Sep. 7, 2012.

G. Wang et al. "World Stage: A Crowdsourcing Paradigm for Social / Mobile Music." In Proceedings of the International Computer Music Conference (under review), Huddersfield, UK, 2011. <https://ccrma.stanford.edu/~jieun5/publications/2011-icmc-world-stage.pdf> Last accessed Sep. 7, 2012.

L. Werthheimer. "Pomplamoose: Making a Living on YouTube." Apr. 2010. National Public Radio. <http://www.npr.org/templates/story/story.php?storyId=125783271>. Last accessed Sep. 7, 2012.

Billaboop Studio. "CamBox." Tunes Preview. <http://itunes.apple.com/us/app/cambox/id430357708?mt-8&Is=1>. Retrieved Sep. 6, 2012. Last accessed Sep. 7, 2012.

Jieun Oh et al. "Audience-Participation Techniques Based on Social Mobile Computing." Center for Computer Research in Music and Acoustics (CCRMA). Stanford University. Proceedings of the International Computer Music Conference 2011, University of Huddersfield, UK. Jul. 31-Aug. 5, 2011. pp. 665-672.

Nick Kruge. "MadPad: A Crowdsourcing System for Audiovisual Sampling." NIME'11. May 30-Jun. 1, 2011. Oslo, Norway. 6 pages.

Billaboop. "Meet CamBox. <http://www.youtube.com/watch?feature=player_embedded&v=plB817-4ogU." Jun. 15, 2011. Retrieved Sep. 6, 2012.

"MovBeats iPhone app Tutorial video." <http://www.youtube.com/watch?v=e5BInJbaVLU&feature=bf next&list=UULUNi 4thv6IL . . . Sep. 8, 2011. Retrieved Sep. 6, 2012.

Casual Underground. iTunes Preview. "MovBeats." Sep. 9, 2011. <http://itunes.apple.com/us/app/movbeats/id453764961?mt=8>.

Akai Professional. "MPC5000: The New Flagship MPC." 2008 <http://www.akaipro.com.> Retrieved Sep. 6, 2012.

VidRhythm. "Official VidRhythm Trailer." Sep. 6, 2011. <http://www.youtube.com/watch?feature=player_embedded&v=jkh4z9wbz88>. Retrieved Sep. 6, 2012.

Harmonix. "VidRhythm." iTunes Preview. Dec. 13, 2011. <http://itunes.apple.com/us/ap/vidrhythm/id457548851?Is=1&mt=8>. Retrieved Sep. 6, 2012.

\* cited by examiner

CAPTURE OF AUDIO AND VIDEO PORTIONS CLIP A

CAPTURE OF AUDIO AND VIDEO PORTIONS CLIP B

CAPTURE OF AUDIO AND VIDEO PORTIONS CLIP C

AUDIOVISUAL SAMPLING FOR PERCUSSION-TYPE INSTRUMENT WITH CROWD-SOURCED CONTENT SOURCING AND DISTRIBUTION

CROSS-REFERENCE TO RELATED APPLICATION(S)

The present application claims the benefit of U.S. Provisional Application No. 61/532,088, filed Sep. 7, 2011, the entirety of which is incorporated herein by reference.

BACKGROUND

The invention relates generally to musical instruments and, in particular, to techniques suitable for audiovisual capture and musical composition or performance using a portable touch screen device.

RELATED ART

The proliferation of mobile music technology presents opportunities for increasingly sophisticated, yet widely deployable, tools for musical composition and performance. See generally, L. Gaye, L. E. Holmquist, F. Behrendt, and A. Tanaka, "Mobile music technology: Report on an emerging community" in *Proceedings of the International Conference on New Interfaces for Musical Expression*, pages 22-25, Paris, France (2006); see also, G. Wang, G. Essl, and H. Penttinen, "Do Mobile Phones Dream of Electric Orchestras?" in *Proceedings of the International Computer Music Conference*, Belfast (2008). Indeed, applications such as Smule Ocarina™, Leaf Trombone®, I Am T-Pain™, Glee Karaoke and Magic Piano® available from Smule, Inc. have shown that advanced digital acoustic techniques may be delivered on iPhone®, iPad®, iPod Touch® and other iOS® devices in ways that provide users and listeners alike with compelling musical experiences.

As mobile music technology matures and new performance genres emerge, inspiration can be drawn from composition devices that predate the mobile music era. One such device is the Akai Music Production Center, commonly referred to by the acronym MPC used to a identify popular series of electronic musical instruments originally designed by Roger Linn, a pioneer in the field of electronic drum machines, and produced by the Akai Electric Company circa 1988 and onward. Intended to function as a powerful drum machine, the MPCs combined a powerful Musical Instrument Digital Interface (MIDI) sequencer with the ability to sample one's own sounds. Later models featured increasingly powerful sampling, storage, interfacing and sound manipulation facilities, which broaden the use of instrument beyond just drum and rhythm tracks.

A user's main interaction of the MPC employs 16 finger pads to trigger single audio samples when tapped. With this tool, a larger audio clip can be chopped up quickly and distributed to the pads as different subsets of the original sound. Also, individual and potentially unrelated sound clips can be loaded and triggered singularly. These possibilities combined allow for a large number of sonic sample sets to be formed even with just a few seconds of initial material, giving performers a quick way to move from sound clips to expressive, playable instruments. See generally, Two Hand Band, History and Significance of the MPC, a documentary film, published on the internet August 2008 (available, at the time the present application was filed, for retrieval and playback via the URL, http://www.cratekings.com/two-hand-band-history-and-significance-of-the-akai-mpc/).

Improved techniques and solutions are desired that build on inspirations of the past but unlock new opportunities for musical composition, performance and collaboration amongst a new generation of artists using a new generation of audiovisual capable devices and compute platforms.

SUMMARY

It has been discovered that, despite practical limitations imposed by mobile device platforms and applications, truly captivating musical instruments may be implemented in ways that allow musically expressive performances to be captured and rendered in real-time. Building on a set of captured audiovisual segments clipped to provide a palette of audio and synched video, techniques and implementations described herein facilitate a new and highly-personalized (and in some cases crowd-sourced or sourcable) genre of audiovisual sampling and musical performance. Using a palette of captured and/or imported audio and associated video, users can remix to create a coordinated audiovisual performance. Because the audiovisual sampling and musical performance capabilities can be hosted on ubiquitous handheld or other portable computing devices such as smartphones and/or pad-type computers, user/musicians can, in essence, creatively remix their life.

More specifically, techniques have been developed for efficient user capture of individual audiovisual clips for use as expressive elements and for presentation as a palette of audio and synched video for user performances, all using signal and/or video processing techniques suitable given the somewhat limited capabilities of handheld or portable computing devices such as smartphones and/or pad-type computers. Audiovisual clips are presented to user/musicians as a palette of tiles on a multi-touch display surface. Each is independently and concurrently selectable based on user interface gestures to render associated audio and video as a coordinated performance. In some embodiments or situations, some or all of the audiovisual clips in a given palette are locally captured using microphone and video camera interfaces of the portable computing device itself. In some embodiments or situations, at least some of the audiovisual clips may be incorporated into a given palette based on a crowd-sourced distribution model that facilitates user communities and/or collaboration.

Whatever the sourcing of a current palette of audiovisual clips, a user may interact with them in a manner akin to a drum machine or collection of percussion instruments, tap-triggering respective tiles sequentially and, in some cases simultaneously, to express rhythm and with temporally overlapped (or even simultaneous) rendering of the corresponding audiovisual clips. As will be appreciated based on the present description, expressed rhythm and overlap extend to the visual, as well as the audio, domain. In some embodiments, a coordinated performance of the audio (and associated video) as percussion-type expressive elements is recorded for local playback or looping and/or is supplied for rendering at remote devices as an audiovisual media encoding. In some embodiments, the coordinated performance may be supplied to a remote device as a gesture stream suitable for driving audiovisual rendering against the palette of audio percussion clips, a variant thereof or another palette altogether. Notwithstanding the descriptive emphasis on percussion-type expressive elements, persons of ordinary skill in the art will appreciate that audiovisual clips, palettes and, more generally, embodiments in accordance with the present invention are not limited to percussion.

In some embodiments in accordance with the present invention, a method includes using a portable computing device for capture and performance of a coordinated plurality of audiovisual clips, the portable computing device having a multi-touch display surface, and video camera and microphone interfaces. Responsive to a first user selection and to detection of an audio trigger in a first audio stream of an audiovisual performance captured from the video camera and microphone interfaces, a first audiovisual clip is selected. Responsive to further successive user selections and to further successive detections of the audio trigger in audio streams of respective further audiovisual performances captured from the video camera and microphone interfaces, additional audiovisual clips are selected. On the multi-touch display surface, the user is presented with a palette of display tiles each corresponding to an audiovisual clip, wherein at least some of the display tiles respectively correspond to the first and additional audiovisual clips. The display tiles are each independently and concurrently selectable based on user interface gestures of the user on the multi-touch display surface to render the corresponding audiovisual clips as a coordinated performance of the audio and visual portions of the audiovisual clips.

In some cases, the audio trigger includes a user configurable threshold. In some cases, the audio trigger includes one or more of: (i) an onset or amplitude transition in the audio stream captured from the microphone interface, and (ii) an audio brightness or spectral transition in the audio stream captured from the microphone interface. More generally, any of a variety of audio features may be used as an audio trigger as long as detection is computationally tractable given compute cycles available. In some cases, durations of respective audiovisual clips are variable and are dependent on character of the captured audio streams following detection of the audio trigger.

In some embodiments, the method further includes (for at least one of the presented display tiles) retrieving the corresponding audiovisual clip from a first remote host via a communications interface of the portable computing device. In some embodiments, the method further includes audibly and visually rendering the corresponding audiovisual clips as a coordinated performance in real-time correspondence with user interface gestures of the user on the multi-touch display surface.

In some embodiments, the method further includes (prior to the audible rendering) changing a rendered pitch attribute for at least one of the audiovisual clips, wherein the change is indicated by the user on the multi-touch display surface in correspondence with the associated tile. In some cases, prior to the audible rendering, the user changes at least one additional rendering attribute for one or more of the audiovisual clips, the changed additional rendering attribute selected from the set of volume or amplitude, spectral character, reverberation and duration.

In some cases, the user interface gestures include at least a first-type gesture captured at the multi-touch display surface, the first-type gesture triggering audible rendering of the corresponding audiovisual clip. In some cases, the user interface gestures further include at least a second-type gesture captured at the multi-touch display surface, the second-type gesture morphing the audible rendering of the corresponding audiovisual clip. In some cases, the morphing includes pitch shifting the audible rendering in correspondence with a magnitude or extent of the second-type gesture. In some cases, the first-type gesture includes finger or stylus contact with the multi-touch display surface; and the second-type gesture includes travel of one or more finger or stylus contacts across a portion of the multi-touch display surface. First- and second-type gesture examples are merely illustrative and persons of ordinary skill in the art will appreciate possible uses of additional or alternate gestures (multi-touch or otherwise) including but not limited to pinch, splay and multipoint rotation gestures.

In some embodiments, the method further includes storing an audiovisual media encoding of the coordinated performance. In some embodiments, the method further includes transmitting the audiovisual media encoding of the coordinated performance to a second remote host. In some cases, the first and second remote hosts serve social media content. In some cases, the first and second remote hosts are a same host or part of a same service platform.

In some embodiments, the method further includes, for at least one of the audiovisual clips of an audiovisual performance captured from the video camera and microphone interfaces, posting an audiovisual media encoding thereof to the first remote host for subsequent retrieval and inclusion as a display tile in palettes of other users and other portable computing devices.

In some embodiments, a looping facility may be provided to record a sequence of gestures (or the audiovisual clip playbacks triggered thereby) as an audiovisual "base track" for playback in a continuous or repeated loop. Looping gesture sequences or base tracks may, in some situations or embodiments, form a base on which additional gestures and triggered audiovisual clip playbacks may be overdubbed. Indeed, in some embodiments, further includes recording, in correspondence with the user's gestures on the multi-touch display surface, a base track sequence of the audiovisual clips for subsequent playback and overdubbing.

In some embodiments in accordance with the present invention, a portable computing device includes a multi-touch display surface; video camera and microphone interfaces; storage; audiovisual clip selection code and further user interface code. The audiovisual clip selection code is executable on the portable computing device. The audiovisual clip selection code is responsive to user selection and to detection of an audio trigger in an audio stream of an audiovisual performance captured from the video camera and microphone interfaces to select respective audiovisual clips of the audiovisual performance and store media encodings thereof in the storage. The further user interface code is executable on the portable computing device to present, on the multi-touch display surface, the user with a palette of display tiles each corresponding to an audiovisual clip, wherein at least some of the display tiles respectively correspond to the audiovisual clips from the captured the audiovisual performance. The display tiles are each independently and concurrently selectable based on user interface gestures of the user on the multi-touch display surface to render the corresponding audiovisual clips as a coordinated performance of the audio and visual portions of the audiovisual clips.

In some embodiments, the portable computing device further includes a data communications interface and retrieval code executable on the portable computing device to retrieve from a remote host (via the data communications interface) an audiovisual clip and associate the retrieved audiovisual clip with at least one of the presented display tiles.

In some embodiments, the portable computing device further includes code executable on the portable computing device to initiate transmission of an audiovisual media encoding of at least one of the audiovisual clips of an audiovisual performance captured from the video camera and microphone interfaces. The transmission posts the audiovisual clip for subsequent retrieval and inclusion as a display tile in palettes of other users and other portable computing devices.

In some embodiments, the portable computing device further includes audiovisual rendering code executable on the portable computing device and responsive to both a stream of the user interface gestures and a sequencer. In some cases, the sequencer is implemented using code executable on the portable computing device itself and provides the audiovisual rendering code with a sequence of audiovisual clips previously recorded by the user. In some cases, the sequencer is external to the portable computing device and, via a communications interface, the portable computing device receives musical instrument digital interface- (MIDI-) or open sound control- (OSC-) type messages encoding a sequence of the audiovisual clips.

In some embodiments of the present invention, a method includes using a portable computing device for performance of a coordinated plurality of audiovisual clips. On a multi-touch display surface of the portable computing device, the user is presented with a palette of display tiles each corresponding to a respective one of the audiovisual clips, the display tiles each being independently and concurrently selectable based on user interface gestures of the user on the multi-touch display surface to render the corresponding audiovisual clips as a coordinated performance of the audio and visual portions of the audiovisual clips. The method further includes (i) triggering audible rendering of the audio portion of a corresponding audiovisual clip in correspondence with a first-type user interface gesture of the user associable with a particular display tile on the multi-touch display surface and (ii) in correspondence with a current sampling rate for the audible rendering, advancing through a sequence of still image frames that correspond to the visual portion of the corresponding audiovisual clip.

In some embodiments, the method further includes pre-caching the corresponding sequences of still image frames for each of the display tiles, in preparation for subsequent rendering of the audiovisual clips. In some embodiments, the method further includes dynamically varying the current sampling rate for the audible rendering and, in correspondence with the dynamically varied current sampling rate, varying the advance rate through the sequence of still image frames. In some cases, the dynamic varying is in correspondence with a second-type user interface gesture. In some cases, the first-type gesture includes finger or stylus contact with a portion of the multi-touch display surface associable with the particular display tile and the second-type gesture includes travel of one or more finger or stylus contacts across the portion of the multi-touch display surface associable with the particular display tile.

In some embodiments, the method further includes: in preparation for the presenting, and responsive to a user selection and to detection of an audio trigger in a first audio stream of an audiovisual performance captured from the video camera and microphone interfaces, selecting an audiovisual clip thereof and associating the audio and visual portions thereof with the particular display tile. In some embodiments, the method further includes retrieving an audiovisual clip from a first remote host via a communications interface of the portable computing device and associating the audio and visual portions thereof with another one of the display tiles. In some cases, the coordinated plurality of audiovisual clips includes a base track sequence of at least some of the audiovisual clips over which the user interface gesture triggered audio and visual portions are overdubbed.

In some embodiments in accordance with the present invention, a method includes using a portable computing device for performance of a coordinated plurality of audiovisual clips. On a multi-touch display surface of the portable computing device, the method presents the user with a first palette of display tiles each corresponding to a respective one of the audiovisual clips, the display tiles each being independently and concurrently selectable based on user interface gestures of the user on the multi-touch display surface to render the corresponding audiovisual clips as a coordinated performance of the audio and visual portions of the audiovisual clips. The method includes initiating playback of a predetermined sequence of respective ones of the audiovisual clips as an audiovisual base track and, as an overlay on the playback of the audiovisual base track and in correspondence with user interface gestures of the user associable with particular display tiles on the multi-touch display surface, triggering coordinated rendering of the audio and visual portions of corresponding ones of the audiovisual clips.

In some embodiments, the method further includes, prior to the playback, recording user interface gestures of the user to provide the predetermined sequence. In some cases, the predetermined sequence codes a sequence that includes at least some audiovisual clips from the first palette.

In some cases, the predetermined sequence codes a sequence that includes at least some audiovisual clips other than those associated with the first palette displayed on the multi-touch display surface. In some cases, the playback is responsive to either or both of (i) a user interface selection by the user on the multi-touch display surface and (ii) musical instrument digital interface- (MIDI-) or open sound control- (OSC-) type messages received at the portable computing device via a communications interface. In some embodiments, the method further includes initiating, by user interface gesture on the multi-touch display surface, a purchase or license transaction for at least some of the audiovisual clips.

These and other embodiments and suitable variations thereon will be understood with reference to the drawings and description (including claims) that follow.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
FIG. 1 depicts user interaction with a palette of tiles displayed on a touch screen of a pad-type computer programmed in accordance with some embodiments of the present invention.

Building on a set of captured audiovisual segments clipped to provide a palette of audio and synched video, techniques and implementations described herein facilitate a new, highly-personalized, and (in some cases) crowd-sourced or sourcable genre of audiovisual sampling and musical performance. Using a palette of captured and/or imported audio and associated video, users can remix to create a coordinated audiovisual performance.

Techniques have been developed for efficient user capture of individual audiovisual clips for use as expressive elements and for presentation as a palette of audio and synched video for user performances, all using signal and/or video processing techniques suitable given the capabilities of handheld or portable computing devices such as smartphones and/or pad-type computers. Audiovisual clips are presented to user/musicians as a palette of tiles on a multi-touch display surface. Each is independently and concurrently selectable based on user interface gestures to render associated audio and video as a coordinated performance. In some embodiments or situations, some or all of the audiovisual clips in a given palette are locally captured using microphone and video camera interfaces of the portable computing device itself. In some embodiments or situations, at least some of the audiovisual clips may be incorporated into a given palette based on a crowd-sourced distribution model that facilitates user communities and/or collaboration.

Whatever the sourcing of a current palette of audiovisual clips, a user may interact with them in a manner akin to a drum machine or collection of percussion instruments, tap-triggering respective tiles sequentially and, in some cases simultaneously, to express rhythm and with temporally overlapped (or even simultaneous) rendering of the corresponding audiovisual clips. As will be appreciated, expressed rhythm and overlap extend to the visual, as well as the audio domain. In some cases or embodiments, gesture control over the audiovisual expression of a given tile extends to real-time audio playback rate control based on finger travel across a portion of a touchscreen on which the tile is visually rendered. An audio callback mechanism is used to dynamically vary visual frame rate in correspondence with changing audio playback rate.

In some embodiments, a coordinated performance of the audio (and associated video) as percussion-type expressive elements is recorded for local playback or looping. In some embodiments, an encoding of such a performance is supplied for rendering at remote devices as an audiovisual media encoding. In some embodiments, the coordinated performance may be supplied to a remote device as a gesture stream suitable for driving audiovisual rendering against the palette of audio percussion clips, a variant thereof or another palette altogether. In some embodiments, a musical instrument digital interface (MIDI), open sound control (OSC) or similar interface allows event sequences or streams to be introduced into and/or supplied from an audiovisual sampling and performance device.

Audiovisual performances may be recorded (e.g., as MIDI event sequences or OSC format messages) and replayed using a looping mechanism or sequencer. In some cases, such recorded and replayed performances (from the current or from another palette) can serve as an audiovisual base track over which live gesture triggered audiovisual segments are overdubbed. Notwithstanding the descriptive emphasis on percussion-type expressive elements, persons of ordinary skill in the art will appreciate that audiovisual clips, palettes and, more generally, embodiments in accordance with the present invention are not limited to percussion.

FIG. 1 depicts user interaction with a 4×3 palette 110 of tiles displayed on a touch screen of a pad-type computer 101 programmed in accordance with some embodiments of the present invention. In the illustrated embodiment, each of the tiles of the current palette is associated with a respective audiovisual clip previously captured from camera 102 and microphone 103 interfaces and stored in memory (or other local storage) of pad-type computer 101. More generally, some of the illustrated tiles (and associated audiovisual clips) may be captured using other audiovisual capture facilities, retrieved from storage, demand supplied from network servers or services and/or transacted (e.g., purchased or licensed) as part of an in-application purchase revenue model. In general, and whatever the sourcing of audiovisual content, palette 110 of tiles present the user/musician with a multi-tap-triggered performance device whereby touch screen user interface gestures (e.g., taps, swipes, touches, etc.) with a given tile (e.g., tile 111 or tile 112) trigger coordinated audiovisual rendering of an associated audiovisual clip. By rhythmically triggering, and in some cases concurrently or in temporally overlapped fashion, audibly and visually rendering the associated audiovisual clips, the user/musician performs and optionally records a beat-box style musical performance.

Although a single foreground palette of tiles is visible in the depiction of FIG. 1, it will be understood that in some cases or embodiments, additional, alternative, or auxiliary palettes may be readily available for presentation as a current foreground palette using suitable user interface gestures or controls. In addition, while a particular regular tessellation of uniformly-sized rectilinear tiles is depicted, it will be understood that other tessellations, tile shapes, sizes and orientations may be supported in other embodiments.

In general, audiovisual clips that are included in palette 110 may be of differing and non-uniform duration and as described elsewhere herein, may be individually edited/manipulated by the user/musician (e.g., for audio amplitude, pitch, equalization, onset, emphasis or effect) to customize the palette available to the user/musician on the instrument. In addition, in some cases or embodiments, user interface gestures by which audiovisual clips are triggered may affect (in some cases dynamically affect) the pitch, amplitude, playback rate and/or direction of audio rendering for an associated audiovisual clip. As described elsewhere herein, rendering of visuals is in correspondence with audio and (if applicable) dynamic variations in audio playback rate.

Figure 2:
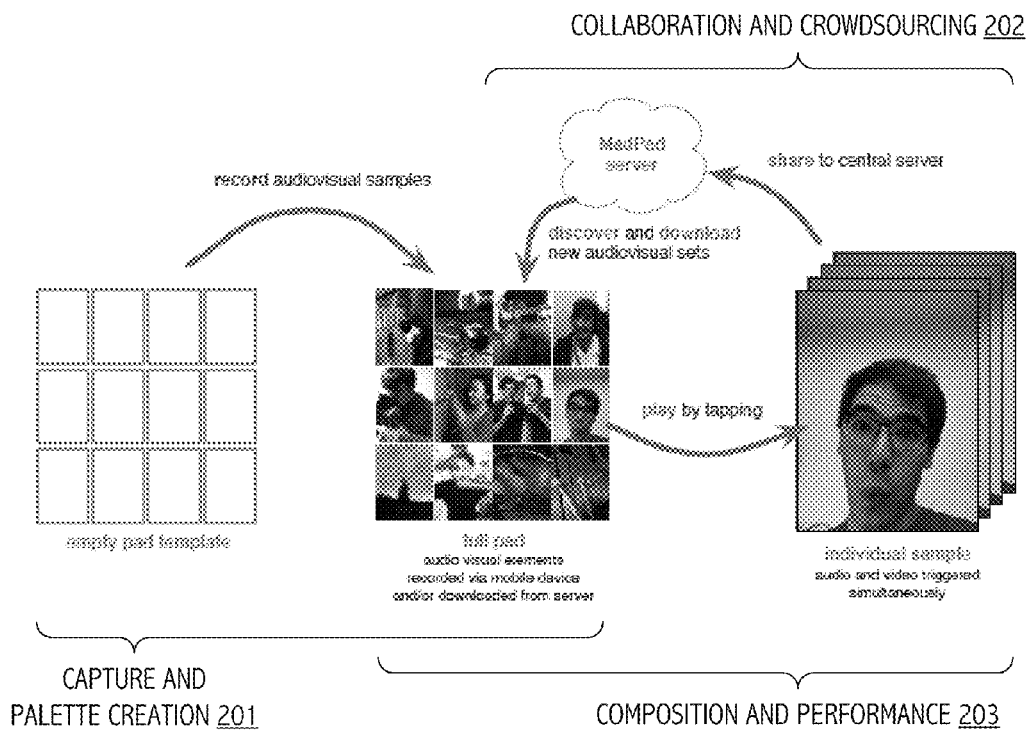
FIG. 2 depicts notionally several aspects of device operation in accordance with some embodiments of the present invention, including capture and creation of audiovisual clips for a tile palette, composition and tap-triggered performance of associated audiovisual clips, and collaboration and crowd sourcing of audiovisual clips and/or tile palettes.
Figure 3:
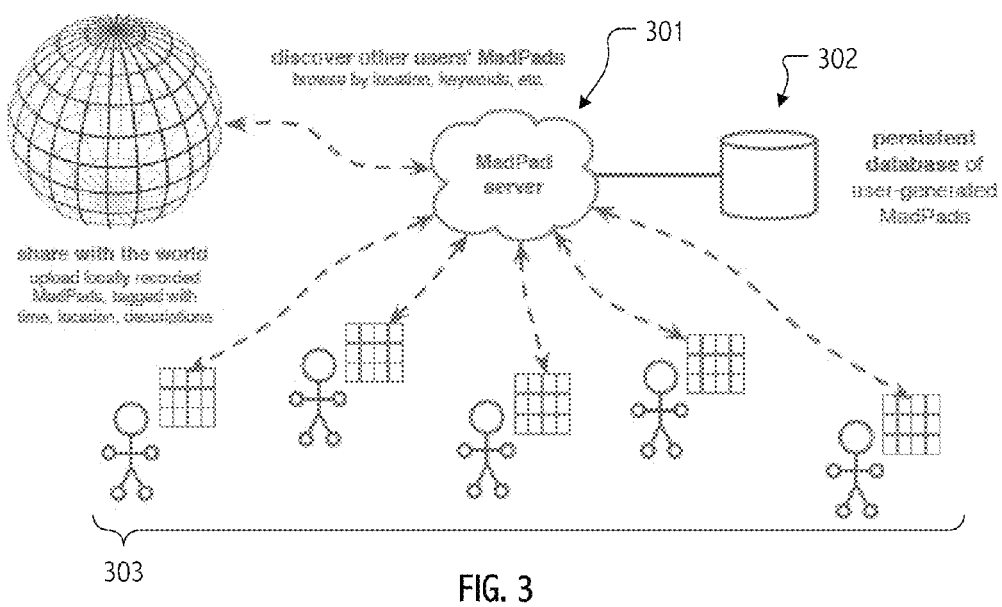
FIG. 3 depicts illustrative aspects of a collaboration and crowd sourcing service platform in accordance with some embodiments of the present invention.

FIG. 2 depicts several aspects of operation of a suitably programmed device (such as pad-type computer 101) in accordance with some embodiments of the present invention. Specifically, FIG. 2 illustrates capture and creation 201 of audiovisual clips of, or for, a tile palette (recall palette 110), by recording audiovisual content from camera and microphone interfaces and/or by introducing audiovisual content sourced 202 from networked services, servers or collaboration partners. FIG. 2 depicts composition and tap-triggered performance 203 from the created palette tiles and associated audiovisual clips. FIG. 3, in turn, depicts illustrative aspects of a collaboration and crowd sourcing service platform (including server(s) 301, backing datastore(s) 302 and networked MadPad client instances 303), in accordance with some embodiments of the present invention.

Figure 4A:
FIGS. 4A, 4B and 4C depict an illustrative sequence of audiovisual clip capture sessions using a pad-type computer programmed in accordance with some embodiments of the present invention.
Figure 4B:
Figure 4C:

FIGS. 4A, 4B and 4C depict an illustrative sequence of audiovisual clip capture sessions (CLIP A, CLIP B and CLIP C) using a pad-type computer programmed in accordance with some embodiments of the present invention. After user selection of a particular tile, and based on detection of an audio trigger, audio and video portions of a captured audiovisual clip are associated with the selected tile for subsequent performance and/or editing.

Figure 5:
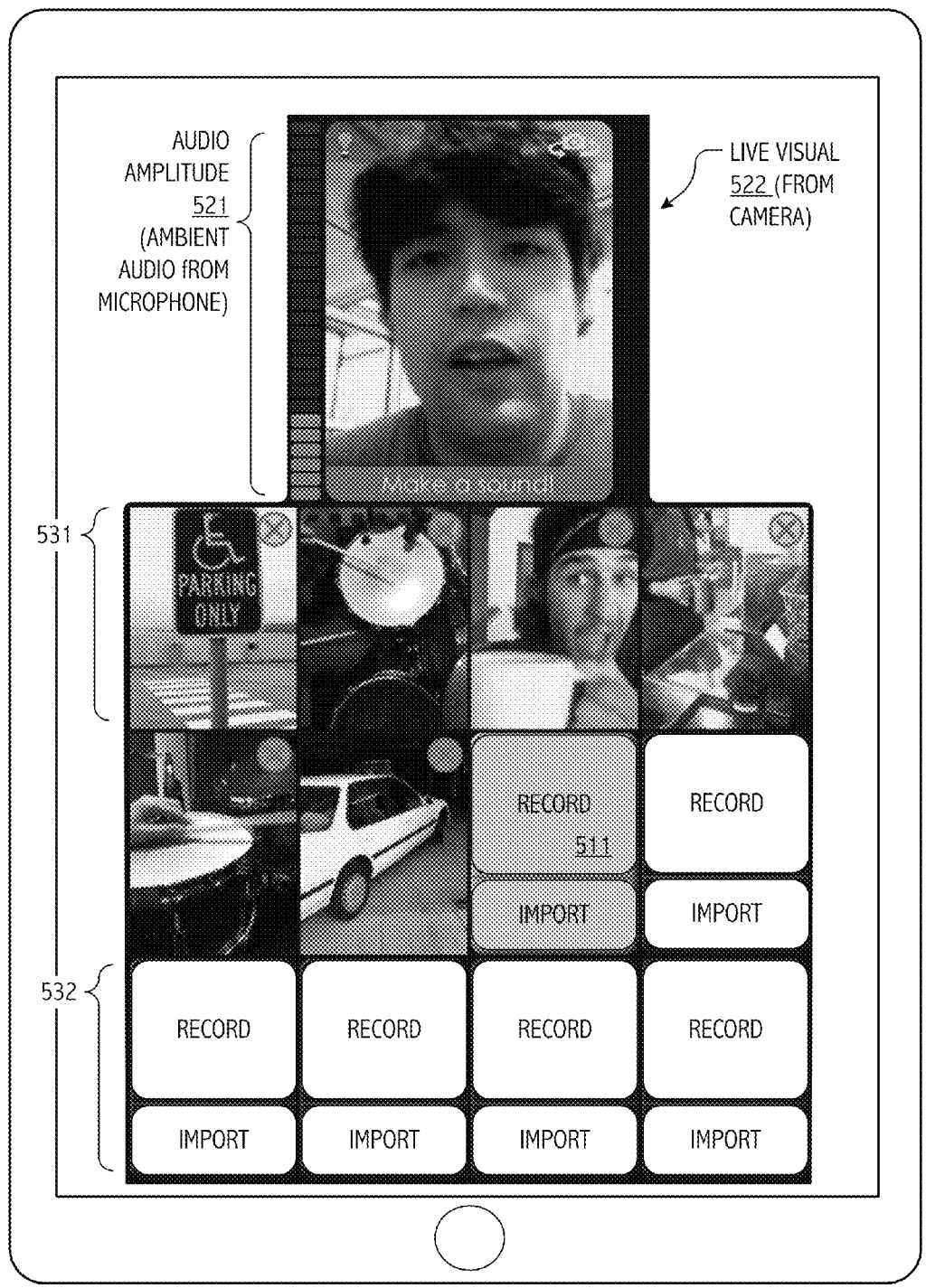
FIG. 5 depicts, in greater detail, an illustrative user interface for audiovisual clip capture on a pad-type computer programmed in accordance with some embodiments of the present invention.

FIG. 5 depicts in greater detail an illustrative user interface for audiovisual clip capture on a pad-type computer programmed in accordance with some embodiments of the present invention. In the depicted user interface state, audiovisual clips have already been recorded (or imported) for six (6) of twelve (12) depicted tiles including each the tiles in a first row 531 thereof, while remaining tiles, including each of the tiles in a third row 532 thereof remain uninitialized. After user selection of a current tile (triggering the "RECORD" method bound to tile 511), audiovisual clip capture code awaits detection of an audio trigger (e.g., sound over a user configurable threshold, an onset or audio brightness transition feature, etc.), whereupon the capture code executes to prepare media encodings of audio and video portions of a short audiovisual clip sampled from microphone and video camera interfaces of the pad-type computer. FIG. 5 illustrates a live visual 522 streaming from the camera interface and a thermometer bar indication 521 of amplitude for an ambient audio signal from the microphone. Particulars of the depicted user interface are meant to be illustrative and persons of ordinary skill in the art will appreciate a wide range of variations consistent with the description herein and with appended claims.

In some embodiments, audiovisual clip capture for a user selected tile (e.g., tile 511) is based on an audio trigger that delimits a clip (on the front end) based on onset of an audio signal and (on the back end) based on a desired duration, fall-off of a measurable associated with the onset trigger and/or an additional back-end audio trigger. In general, the audio portion of the audiovisual clip so captured is suitable for use as percussion and is associated with the selected tile for subsequent performance and/or editing by the user. In some embodiments, the user interface provides a further capability to import audiovisual clips from remote network-connected content sources. Export (e.g., transmission to and posting on a remote host or service platform) of captured audiovisual clips and/or entire palettes thereof is also supported in some embodiments.

Typically, the starting point for audio and video recording is triggered by an onset indicative threshold (whether specified in amplitude or spectral characteristics) in the ambient audio input to ensure that a percussive onset is present (on playback) when playback of the captured audio and video samples called for during a tap-triggered, beat-box style performance. In some realizations of the present techniques, onset triggering is implemented using a one-pole smoothing filter or "envelope follower" that employs a user-defined volume threshold and engages the audio and video recording process as soon as that volume threshold is surpassed. The volume threshold is preferably user-defined to accommodate variations in the amount of background noise when the user is attempting to record a sample and to avoid accidental triggering by unintended background sounds. A lower, quieter threshold is used for a quieter room while a higher, louder threshold is used for a louder room. Best results are typically achieved when the trigger threshold is just barely above the volume level of the room.

Figure 6:
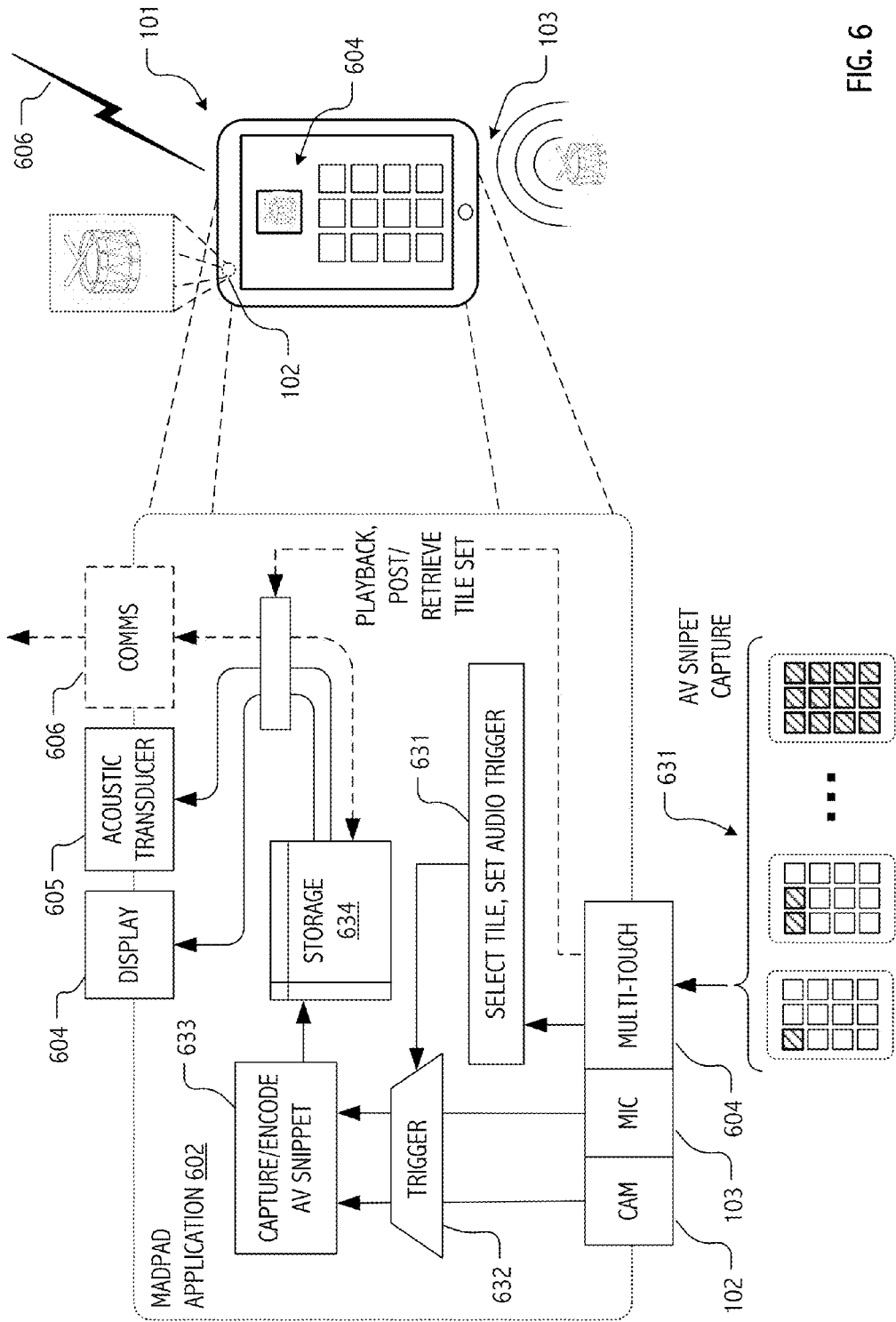
FIG. 6 depicts certain illustrative "capture mode" operational aspects of a pad-type computer programmed in accordance with some embodiments of the present invention.

FIG. 6 depicts certain illustrative operational aspects of a pad-type computer 101 programmed to implement the illustrated capture mode functional flows of MadPad application 602 in conjunction with device firmware. More specifically, FIG. 6 illustrates functional flows of MadPad application 602 that provide operations generally in accord with foregoing description(s) of FIGS. 4A, 4B, 4C and 5 to capture, encode and store (for tap-triggered playback) audio and video portions of audiovisual clips sampled from microphone and video camera interfaces (recall camera 102 and microphone 103, FIG. 1) of the pad-type computer 101. Note that allocation of functionality to application or firmware is somewhat arbitrary, but in the illustration of FIG. 6 corresponds generally to an allocation that employs firmware, system or developer libraries or other facilities of a target compute platform for image buffer, audio sampling, audio playback and multi-touch gesture capture and display from/to camera 102, microphone 103, speaker 605, and touch screen 604 as well as data communications interfaces 606 (e.g., 3G/4G wireless data, WiFi, Bluetooth or near field communication (NFC), wired communications via USB, Firewire or other connection) as is typical of iOS handheld devices available from Apple Corporation and competitive alternatives in the marketplace.

Responsive to user interface selections of individual tiles and of an applicable audio trigger (631), ambient audio sampled from microphone 103 is evaluated and gated (632) based on correspondence with a percussive onset indicative trigger level, and upon detection thereof, audio and video (from microphone 103 and camera 102, respectively) are captured and encoded (633) for storage in local storage 634 as an audiovisual clip in association with a particular tile of the current palette. In some embodiments in accord with FIG. 6, gating 632 provides both the front-end onset triggering and the fall-off (or decay-oriented) back-end termination of the capture and encoding (633) of a particular audiovisual clip. However, in other embodiments, a fixed clip length may be enforced and/or clips may be truncated based on post-processing analysis of the captured audio signal. Once a sufficient palette of audiovisual clips have been captured and encoded (or imported from external sources), a user musician may proceed to perform (and optionally record for later playback) a tap-triggered musical performance sequence (with possible overlap) of the audiovisual clips.

Figure 7A:
FIGS. 7A, 7B and 7C depict an illustrative sequence of a user/musician performance by way of tap-triggered renderings of audio and video portions of audiovisual clips that have been associated with respective display tiles of a palette.
Figure 7B:
Figure 7C:
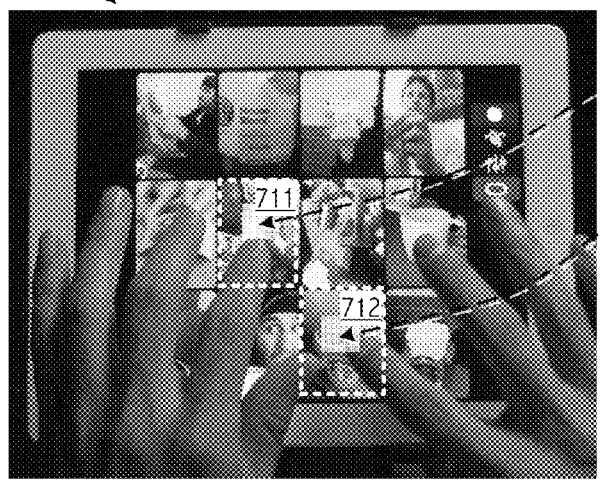

FIGS. 7A, 7B and 7C depict an illustrative sequence of user/musician interactions with the touch screen of pad-type computer 101 as part of a beat-box style musical performance punctuated by finger tap- (or contact-) triggered renderings of audio and video portions of audiovisual clips that have been associated with respective display tiles of a palette. Although cadence and tempo of such a performance are difficult to illustrate without motion video, based on the description herein (including the FIGS. 7A, 7B and 7C sequence of stills), persons of ordinary skill in the art will immediately visualize a performer tapping a cadence of single- and multi-touch finger contacts with the touch screen and thereby triggering the rendering of audiovisual clips in correspondence therewith.

Figure 8:
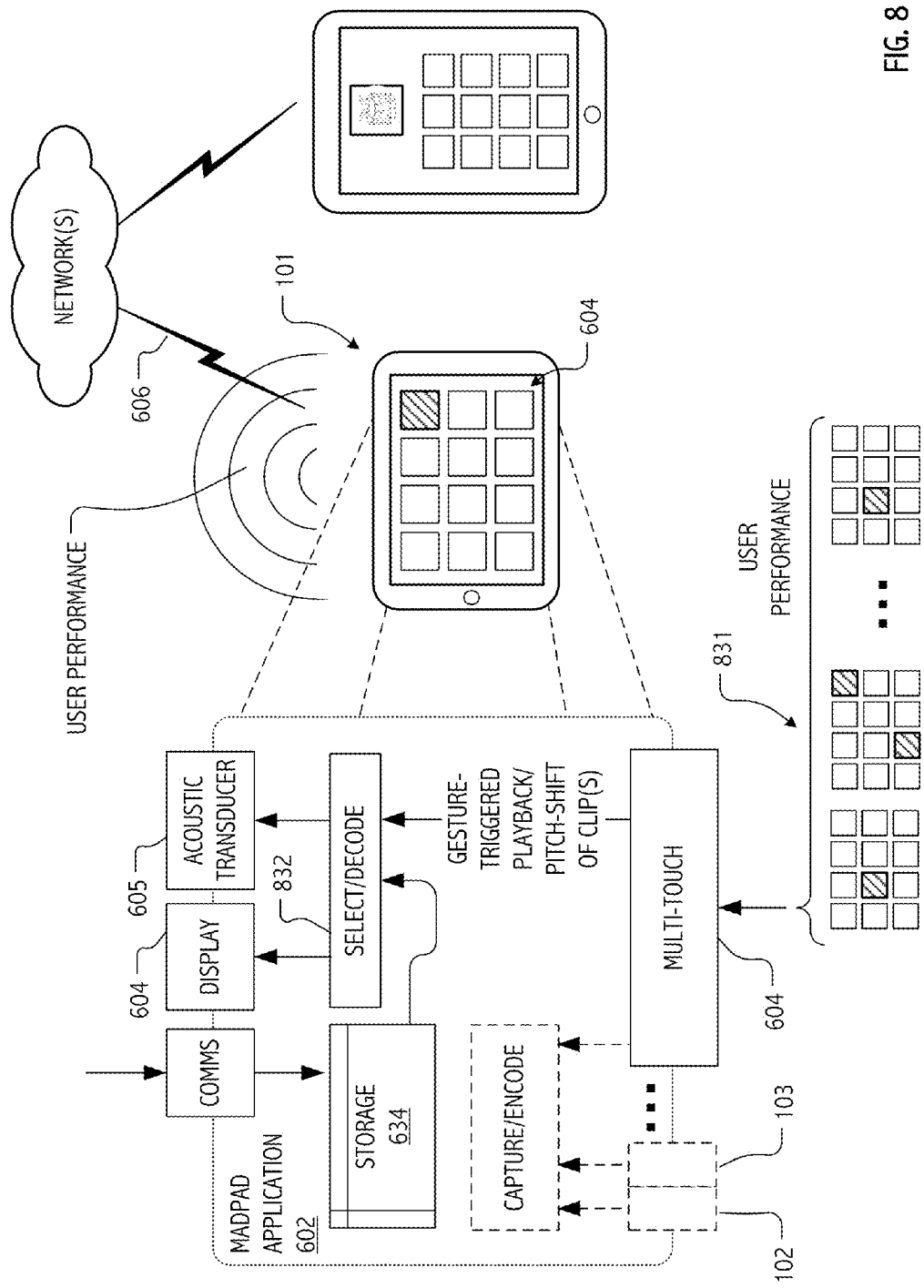
FIG. 8 depicts certain illustrative "performance mode" operational aspects of a pad-type computer programmed in accordance with some embodiments of the present invention.
Figure 9:
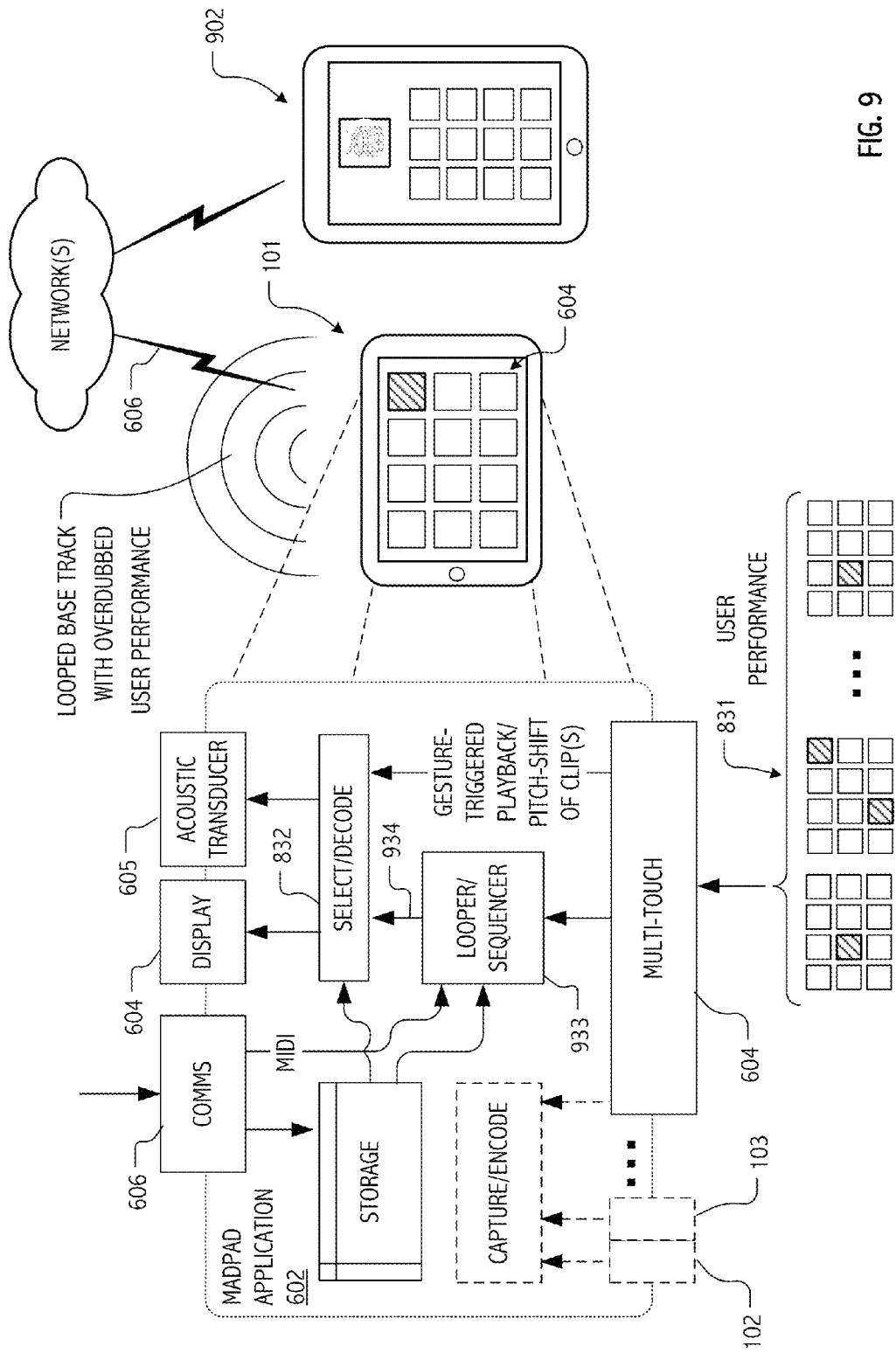
FIG. 9 depicts for a pad-type computer programmed in accordance with some embodiments of the present invention, a variation on the previously illustrated "performance mode" operational aspects in which a looper or sequencer provides a base track over which a user's performance is overdubbed.

Specifically, FIG. 7A depicts an illustrative palette presented on the touch screen of pad-type computer 101 programmed in accordance with some embodiments of the present invention to concurrently render (i.e., simultaneously or at least temporally overlapped) respective audio and visual portions of the associated audiovisual clips. FIG. 7B depicts single-touch tap selection 701 of tile 711. FIG. 7C illustrates a multi-tap triggering (tap selections 702 and 703) of respective display tiles (tiles 711 and 712) on touch screen of pad-type computer 101. Although the depictions of FIGS. 7B and 7C are styled to facilitate explanation of tap-triggered musical performance of previously captured or imported tiles and associated audiovisual clips, it will be appreciated based on other descriptions herein, that such a musical performance may, in some cases or embodiments, be performed against (or overdubbed on top of) a "base track" looped or sequenced from local storage. Likewise, the user/musician performance depicted illustratively in FIGS. 7A, 7B and 7C may be recorded for future looping or sequencing as such a base track. FIGS. 8 and 9, which follow, depict functional flows with and without looping.

Turning first to FIG. 8, certain illustrative operational aspects are illustrated relative to a pad-type computer 101 programmed to implement the illustrated performance mode functional flows of MadPad application 602 in conjunction with device firmware. Specifically, FIG. 8 depicts functional flows that implement tap- or other gesture-triggered playback of audio and video portions of audiovisual clips retrieved from local storage 634 in correspondence with a sequence of gestures 831 by which the user expresses his/her performance on multi-touch display 604. Based on the sequence, overlap and simultaneity of such triggering (and, if applicable, in accord with any ornamentation such as later described with reference to FIG. 10), selection/decode functions 832 operate to retrieve audiovisual clips encoded in local storage 634 and to decode same for audible and visual rendering (via acoustic transducer 605 and multi-touch display 604).

FIG. 9 likewise depicts analogous functional flows that implement tap- or other gesture-triggered playback of audio and video portions of audiovisual clips retrieved from local storage 634 in correspondence with a sequence of gestures 831. However, in the variation of FIG. 9, a looper or sequencer 933 is operant to supply selection/decode functions 832 with an additional stream 934 of triggerings that cause selection/decode functions 832 to retrieve corresponding audiovisual clips from local storage 634 and render same as a base track over which playback of audiovisual clips, e.g., those selected and decoded based on the users own tap-triggered expression (831), are overdubbed. In some cases or embodiments, looper or sequencer 933 plays back a prior tap-triggered expression of the user him/herself for which sequencing information has been recorded in local storage 634. In some cases or embodiments, looper or sequencer 933 operates on an externally sourced base track sequencing, such as performance- or artist-specific audiovisual content retrieved (e.g., via communications interface 606) from a remote server or service (e.g., by way of an in-app purchase/license transaction) or as may be supplied in real-time (e.g., as MIDI or OSC message sequences communicated via communications interface 606) from another MIDI or OSC enabled musical instrument or, indeed, from another instance of MadPad application 602 executing on another pad-type computer 902.

Any of a variety of audio encoding formats may be employed consistent with any storage-, platform-, firmware- or audiovisual library-related design constraints or preferences, although in some embodiments of the present invention, it is desirable to encode audio and video as separate streams to facilitate audio playback rate metered advance through a sequence of video frames. For example, in some embodiments, pitch-shifting is supported using variation of an audio playback sampling rate. To efficiently maintain synchronization between audio and video portions of an audiovisual clip, a rate of advance through a sequence of still image frames that correspond to the visual portion of the audiovisual clip is likewise varied. For example, in some embodiments of MadPad application 602, the playback video frames are individual images posted to the screen at intervals driven by the audio playback. Frames are timed according to the number of samples of audio equivalent to one frame of video. Audio sampling rate $A_s$ and video frame capture rate $V_s$ are both sampled at regular intervals, thus the sampling period of one can be expressed in terms of the other.

$$V_T = (A_s/V_s) * A_T$$

Multithreaded processing can allow the otherwise computationally expensive overhead of displaying images on the screen to not interfere with the audio processing callback, which may be implemented as follows:

```
// pseudo code for the audio callback
// determine the audio samples per frame of video
    samplesPerFrame=audioSampleRate/videoFrameRate;
// show the first image
showFirstVideoFrame( );
// iterate through the audio samples updating the frame
// at the correct intervals
for (int i=0; i<totalSamplesInAudio; i++) {
    // keep track of the current samples on this frame
    tickCounter++;
    // post the update to change video frames
    if (tickCounter >=samplesPerFrame) {
        updateToNextVideoFrame( );
        tickCount=0;
    }
}
```

This allows for tight integration of the video and audio components of an audiovisual clip, especially when variable playback rate is used, e.g., based on user settings of pitch shift to be applied to a particular audiovisual clip or (as illustrated in FIG. 10 which follows) if user interfaces gestures captured at multi-touch display 604 provide dynamic, real-time ornamentation which is coupled into the audio callback loop as a variable playbackRate. In this case, and as shown in the modified pseudocode that follows, tickCount increases in increments of playbackRate, which is expressed as a fraction of a sample.

```
// pseudocode assumes playbackRate is user controlled
// in real time and expressed as a fraction where 1.0
// is regular speed
for (int i=0; i<totalSamplesInAudio; i++) {
    // only add the partial sample to the tick counter
    tickCounter+=playbackRate;
    // post the update to change video frames
```

```
    if (tickCounter >=samplesPerFrame) {
        updateToNextVideoFrame( );
        tickCount=0;
    }
}
```
As an example, we see that half speed would result in each video frame displaying for twice as long, and conversely double speed would result in each frame lasting half as long.

In some embodiments, operant pitch-shifts (and values for playbackRate) may be established (e.g., on a clip-by-clip basis, see FIG. 11) by the user using an editing feature of the user interface. In some embodiments, pitch-shifts (or further pitch shifts) are dynamically variable in real-time in response to user interface gestures that vary the value playbackRate. See FIG. 10B. In either case, runtime manipulation of frame advance rate in correspondence with changes in the audio playback sampling rate provides a computationally efficient and responsive mechanism for maintaining synchrony between audio and video renderings.

Figure 10A:
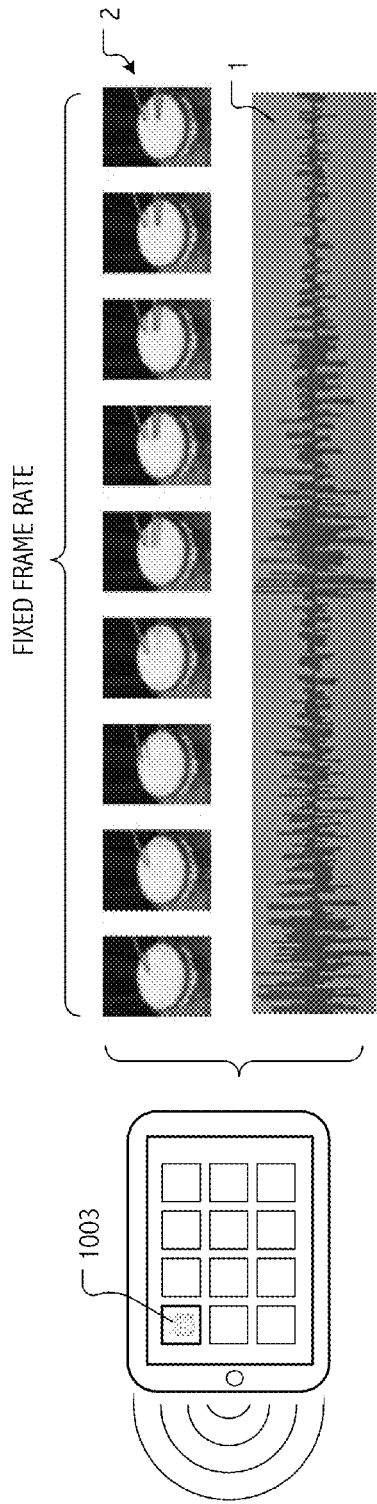
FIGS. 10A and 10B graphically depict an effect of user-gesture based dynamic variation in playback rate in accordance with some embodiments of the present invention.
Figure 10B:
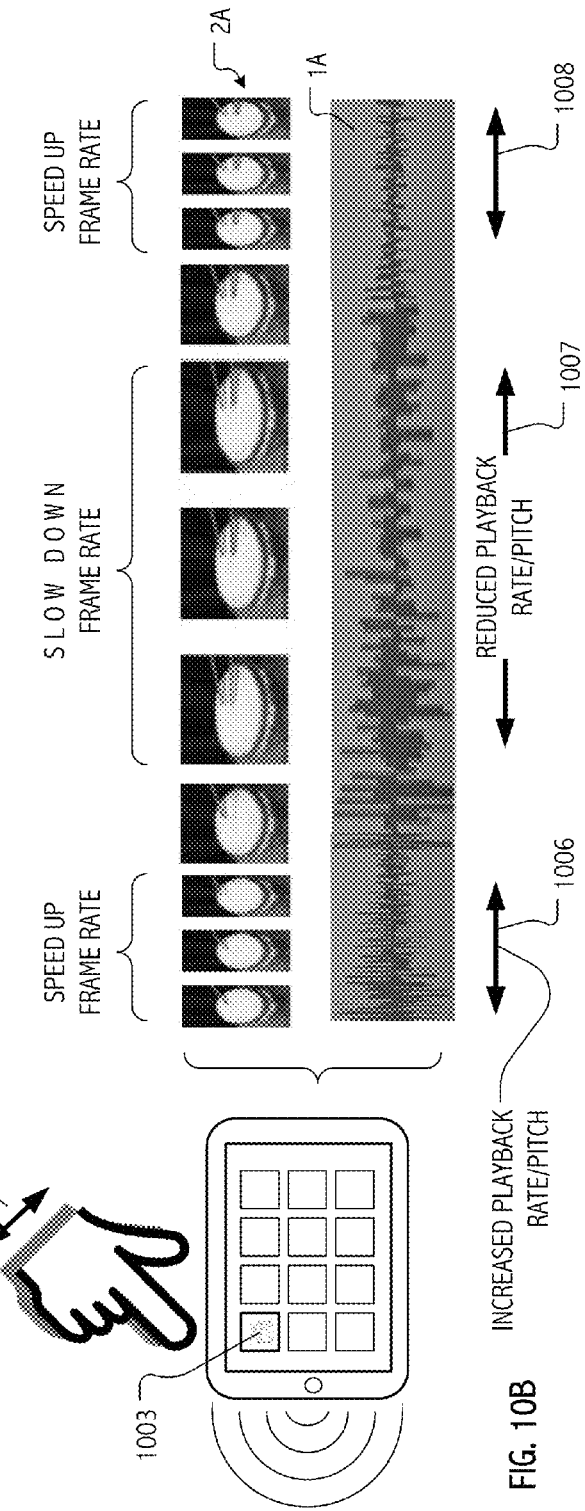

FIGS. 10A and 10B graphically illustrate the effect of user-gesture based dynamic variation in playback rate (recall the playbackRate variable in the foregoing pseudocode). Specifically, FIG. 10A illustrates the baseline case of unornamented tap-triggered playback of an audio signal 1 and a coordinated sequence 2 of video frames that together constitute the audiovisual clip retrieved from storage, decoded and audibly and visually rendered in response to a finger tap triggering of display tile 1003. Audiovisual rendering is performed at a frame rate that is fixed. In general, the fixed frame rate may correspond to the originally sampled content or may be user defined in accord with a user-specified pitch shift. FIG. 10B, on the other hand, illustrates the effect of dynamic variation 1005 in playback rate (e.g., changes to the value of the playbackRate variable in the course of audiovisual clip rendering) in response to expressed ornamentation of the user performance, e.g., by finger travel ornamentation in some user interface designs.

Thus (and for example), responsive to finger travel ornamentation in one direction relative to finger contact with display tile 1003, playback rate is increased during an early portion 1006 of audiovisual rendering. Pitch of audio signal 1A increases (as visually depicted in FIG. 10B) and frames 2A of the coordinated video are advanced at a correspondingly increased rate (e.g., in accordance with the effect of an increased value of the playbackRate variable in operation of the above-described pseudocode). Responsive to finger travel ornamentation in the other direction, playback rate is reduced during a middle portion 1007 of the audiovisual rendering. Pitch of audio signal 1A decreases (as visually depicted in FIG. 10B) and frames 2A of the coordinated video are advanced at a correspondingly slower rate (e.g., in accordance with a reduced value of the playbackRate variable). Finally, responsive to finger travel ornamentation (back) in the first direction, playback rate is again increased during a latter portion 1008 of the audiovisual rendering. Pitch of audio signal 1A again increases and frames 2A of the coordinated video are advanced at a correspondingly faster rate (e.g., again in accordance with an increased value of the playbackRate variable). Although dynamic variation in playback rate is illustrated and described primarily relative to three particular portions (1006, 1007 and 1008) of the audiovisual rendering, it will be appreciated based on the description herein that dynamic variation playback rate may be, and typically is, more-or-less continuously variable in correspondence with the magnitude of user interface gesture expressed ornamentation.

Figure 11:
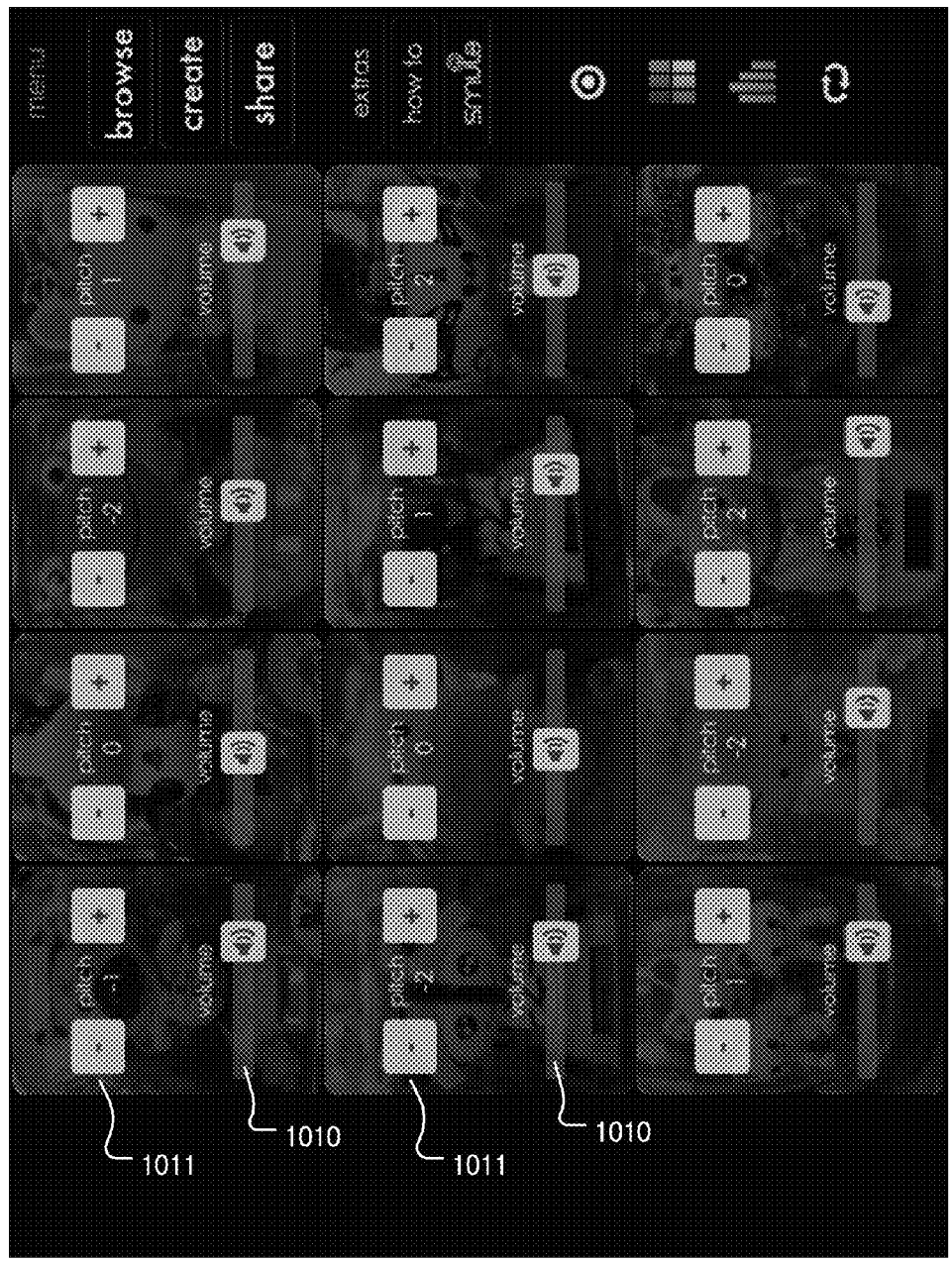
FIG. 11 depicts an illustrative user interface for editing of audible rendering attributes of the individual audiovisual clips associated with display tiles of a current palette.

FIG. 11 depicts an illustrative user interface for editing of audible rendering attributes of the individual audiovisual clips associated with display tiles of a current palette. In the illustrated user interface, audio volume controls (see e.g., volume controls 1010) and desired pitch shift (see e.g., pitch shift controls 1011) are manipulable on a clip-by-clip basis. Persons of ordinary skill in the art will appreciate suitable extensions to allow manipulation of other or additional rendering attributes, including visual rendering attributes.

Figure 12:
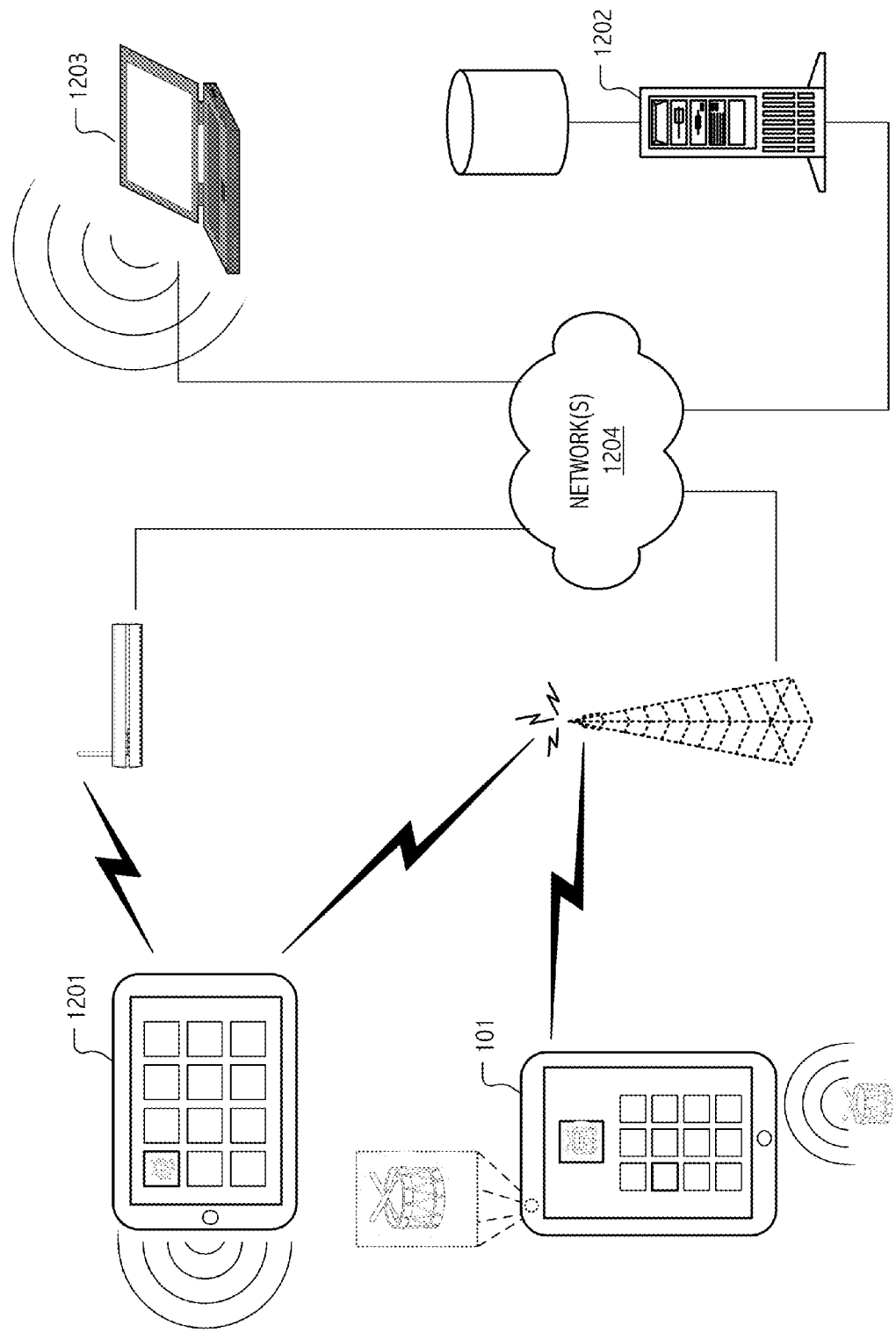
FIG. 12 is a network diagram that depicts an illustrative environment in which pad-type computers each programmed in accordance with some embodiments of the present invention may be deployed.

FIG. 12 depicts a network diagram in which an audiovisual clip (or palette thereof) is captured or otherwise prepared at a first pad-type computer 101 and supplied for performance at a second pad-type computer 1201. Either or both of the first and second pad-type computers are programmed in accordance with embodiments of the present invention described herein and, in some situations or embodiments, first and second pad-type computers may be operated in a coordinated musical performance. Additional networked resources, e.g., server 1202, laptop 1203 and indeed, any of a variety of servers or service platforms that may be hosted in "the cloud" or network 1204 may act as sources or repositories for content (e.g., of palettes of audiovisual clips and/or encodings of captured performances), as transfer points or transaction facilities for in-app purchases, and/or as performance targets.

OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. In particular, although implementations and techniques described herein tend to build upon or emphasize relatively short percussion-type clips of audio and synched video, embodiments in accordance with the present invention are not necessarily limited thereto. Indeed, based on the description herein, persons of ordinary skill in the art will appreciate the use of palettes that may include longer audiovisual clips in addition to, or in some cases, to the exclusion of percussion-type clips. Notwithstanding the descriptive focus on percussion-type audiovisual clips, certain of the inventive concepts described herein will be understood to have more general applicability.

Embodiments in accordance with the present invention may take the form of, and/or be provided as, a computer program product encoded in a machine-readable medium as instruction sequences and other functional constructs of software, which may in turn be executed in a computational system (such as an iPhone™ or iPad™ handheld, a mobile device or a portable computing device) to perform methods described herein. iPhone and iPad are trademarks of Apple, Inc. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
using a portable computing device for capture and performance of a coordinated plurality of audiovisual clips, the portable computing device having a multi-touch display surface, and video camera and microphone interfaces;
responsive to a first user selection and to detection of an audio trigger in a first audio stream of an audiovisual performance captured from the video camera and microphone interfaces, selecting first audiovisual clip thereof;
responsive to further successive user selections and to further successive detections of the audio trigger in audio streams of respective further audiovisual performances captured from the video camera and microphone interfaces, selecting additional audiovisual clips thereof;
on the multi-touch display surface, presenting the user with a palette of display tiles each corresponding to an audiovisual clip, wherein at least some of the display tiles respectively correspond to the first and additional audiovisual clips,
the display tiles each being independently and concurrently selectable based on user interface gestures of the user on the multi-touch display surface to render the corresponding audiovisual clips as a coordinated performance of the audio and visual portions of the audiovisual clips.

2. The method of claim 1,
wherein the audio trigger includes a user configurable threshold.

3. The method of claim 1, wherein the audio trigger includes one or more of:
an onset or amplitude transition in the audio stream captured from the microphone interface; and
an audio brightness or spectral transition in the audio stream captured from the microphone interface.

4. The method of claim 1,
wherein durations of respective audiovisual clips are variable and dependent on character of the captured audio streams following detection of the audio trigger.

5. The method of claim 1, further comprising:
for at least one of the presented display tiles, retrieving the corresponding audiovisual clip from a first remote host via a communications interface of the portable computing device.

6. The method of claim 1, further comprising:
in real-time correspondence with user interface gestures of the user on the multi-touch display surface, audibly and visually rendering the corresponding audiovisual clips as a coordinated performance.

7. The method of claim 6, further comprising:
prior to the audible rendering, changing a rendered pitch attribute for at least one of the audiovisual clips, wherein the change is indicated by the user on the multi-touch display surface in correspondence with the associated tile.

8. The method of claim 7,
prior to the audible rendering, the user changing at least one additional rendering attribute for one or more of the audiovisual clips, the changed additional rendering attribute selected from the set of volume or amplitude, spectral character, reverberation and duration.

9. The method of claim 6,
wherein the user interface gestures include at least a first-type gesture captured at the multi-touch display surface, the first-type gesture triggering audible rendering of the corresponding audiovisual clip.

10. The method of claim 9,
wherein the user interface gestures further include at least a second-type gesture captured at the multi-touch display surface, the second-type gesture morphing the audible rendering of the corresponding audiovisual clip.

11. The method of claim 10,
wherein the morphing includes pitch shifting the audible rendering in correspondence with a magnitude or extent of the second-type gesture.

12. The method of claim 10,
wherein the first-type gesture includes finger or stylus contact with the multi-touch display surface; and
wherein the second-type gesture includes travel of one or more finger or stylus contacts across a portion of the multi-touch display surface.

13. The method of claim 6, further comprising:
storing an audiovisual media encoding of the coordinated performance.

14. The method of claim 13, further comprising:
transmitting the audiovisual media encoding of the coordinated performance to a second remote host.

15. The method of claim 14,
wherein the first and second remote hosts serve social media content.

16. The method of claim 14,
wherein the first and second remote hosts are a same host or part of a same service platform.

17. The method of claim 13, further comprising:
for at least one of the audiovisual clips of an audiovisual performance captured from the video camera and microphone interfaces, posting an audiovisual media encoding thereof to the first remote host for subsequent retrieval and inclusion as a display tile in palettes of other users and other portable computing devices.

18. The method of claim 1, further comprising:
recording, in correspondence with the user's gestures on the multi-touch display surface, a base track sequence of the audiovisual clips for subsequent playback and overdubbing.

19. A portable computing device comprising:
a multi-touch display surface; video camera and microphone interfaces; and storage;
audiovisual clip selection code executable on the portable computing device, the audiovisual clip selection code responsive to user selection and to detection of an audio trigger in an audio stream of an audiovisual performance captured from the video camera and microphone interfaces to select respective audiovisual clips of the audiovisual performance and store media encodings thereof in the storage; and
user interface code executable on the portable computing device to present, on the multi-touch display surface, the user with a palette of display tiles each corresponding to an audiovisual clip, wherein at least some of the display tiles respectively correspond to the audiovisual clips from the captured the audiovisual performance, the display tiles each being independently and concurrently selectable based on user interface gestures of the user on the multi-touch display surface to render the corresponding audiovisual clips as a coordinated performance of the audio and visual portions of the audiovisual clips.

20. The portable computing device of claim 19, further comprising:
   a data communications interface; and
   retrieval code executable on the portable computing device to retrieve from a remote host via the data communications interface an audiovisual clip and associate the retrieved audiovisual clip with at least one of the presented display tiles.

21. The portable computing device of claim 19, further comprising:
   code executable on the portable computing device to initiate transmission of an audiovisual media encoding of at least one of the audiovisual clips of an audiovisual performance captured from the video camera and microphone interfaces, the transmission posting the at least one audiovisual clip for subsequent retrieval and inclusion as a display tile in palettes of other users and other portable computing devices.

22. The portable computing device of claim 19, further comprising:
   audiovisual rendering code executable on the portable computing device and responsive to both a stream of the user interface gestures and a sequencer.

23. The portable computing device of claim 22,
   wherein the sequencer is implemented using code executable on the portable computing device itself and provides the audiovisual rendering code with a sequence of audiovisual clips previously recorded by the user.

24. The portable computing device of claim 22,
   wherein the sequencer is external to the portable computing device and, via a communications interface, the portable computing device receives musical instrument digital interface- or open sound control-type messages encoding a sequence of the audiovisual clips or gestures selective therefor.

* * * * *